(12) United States Patent
Ozeki

(10) Patent No.: US 9,908,584 B2
(45) Date of Patent: Mar. 6, 2018

(54) MOTORCYCLE

(71) Applicant: SUZUKI MOTOR CORPORATION, Shizuoka-Ken (JP)

(72) Inventor: Hisashi Ozeki, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 14/840,460

(22) Filed: Aug. 31, 2015

(65) Prior Publication Data

US 2016/0068219 A1 Mar. 10, 2016

(30) Foreign Application Priority Data

Sep. 4, 2014 (JP) ................................. 2014-179838
Sep. 4, 2014 (JP) ................................. 2014-179839

(51) Int. Cl.
*B62K 11/00* (2006.01)
*B62K 25/28* (2006.01)
*B62K 11/04* (2006.01)

(52) U.S. Cl.
CPC ............ *B62K 25/283* (2013.01); *B62K 11/04* (2013.01); *B62K 2202/00* (2013.01)

(58) Field of Classification Search
CPC ... B62K 25/283; B62K 11/04; B62K 2202/00
USPC .................................................. 180/219, 230
See application file for complete search history.

(56) References Cited

U.S. PATENT DOCUMENTS 5,152,361 A * 10/1992 Hasegawa ................ B62M 7/02
180/227
6,481,408 B2 * 11/2002 Tsutsumikoshi ........ F02B 61/02
123/192.2

2008/0121454 A1 * 5/2008 Oishi ....................... F01M 9/06
180/219

(Continued)

FOREIGN PATENT DOCUMENTS

JP H01-232121 A 9/1989
JP 2002019682 A 1/2002

(Continued)

OTHER PUBLICATIONS

Japanese Office Action corresponding to Japanese Patent Application 2014-179839, dated Nov. 28, 2017.

(Continued)

*Primary Examiner* — Tony H Winner
(74) *Attorney, Agent, or Firm* — Barnes & Thornburg LLP

(57) ABSTRACT

A motorcycle having a crankcase supporting a crankshaft of an engine, a driving force transmission device at an intermediate position between the crankshaft and a driving wheel to transmit rotational force from the crankshaft, and a swing arm that swingably supports the driving wheel, wherein the driving force transmission device includes a continuously variable transmission provided with an endless flexible member stretched between a drive pulley and a driven pulley, and a continuously variable transmission case covering the continuously variable transmission, and wherein the swing arm includes a pivot portion provided on one end side of the swing arm to be swingably attached to a vehicle body frame or the crankcase, and a driving wheel support portion provided on another end side of the swing arm to rotatably support the driving wheel.

4 Claims, 9 Drawing Sheets

(56) References Cited

U.S. PATENT DOCUMENTS

| | | | |
|---|---|---|---|
| 2008/0179127 A1* | 7/2008 | Oishi | B62J 25/00 |
| | | | 180/230 |
| 2009/0050391 A1* | 2/2009 | Nobuhira | B62M 7/02 |
| | | | 180/219 |
| 2009/0223731 A1* | 9/2009 | Arnold | B62K 11/04 |
| | | | 180/231 |

FOREIGN PATENT DOCUMENTS

| | | | |
|---|---|---|---|
| JP | 2007262930 A | 10/2007 | |
| JP | 2008183925 A | 8/2008 | |
| JP | 2008183926 A | 8/2008 | |
| JP | 2008185055 A | 8/2008 | |
| JP | 2008223880 A | 9/2008 | |
| JP | 2011196250 A | 10/2011 | |
| JP | 2012210856 A | 11/2012 | |
| JP | 2014104791 A | 6/2014 | |

OTHER PUBLICATIONS

Japanese Office Action corresponding to Japanese Patent Application 2014-179838, dated Dec. 19, 2017.

\* cited by examiner

MOTORCYCLE

PRIORITY CLAIM

This patent application claims priority to Japanese Patent Application Nos. 2014-179838, filed 4 Sep. 2014, and 2014-179839, filed 4 Sep. 2014, the disclosures of which are incorporated herein by reference in their entirety.

BACKGROUND OF THE INVENTION

Field of the Invention

The present invention relates to a motorcycle, and more particularly, to a motorcycle in which arrangement of a continuously variable transmission in a driving force transmission device is improved.

Description of the Related Art

Patent Document 1 (Japanese Patent Laid-Open No. 2002-19682) discloses a power transmission device of a scooter-type motorcycle. This power transmission device transmits rotational force from a crankshaft to a chain-type transmission mechanism in a swing arm through a V-belt continuously variable transmission mechanism and a clutch mechanism to drive a rear wheel that is rotatably supported by the swing arm.

However, in the power transmission device described in Patent Document 1, the crankshaft, a rotating center shaft of a drive pulley (coaxial with the crankshaft) and a rotating center shaft of a driven pulley (main shaft) of the continuously variable transmission mechanism, and a pivot (drive shaft) of the swing arm, are arranged substantially linearly in a vehicle longitudinal direction.

Thus, if the drive pulley and the driven pulley of the continuously variable transmission mechanism are increased in diameter in order to improve driving performance of a vehicle, a dimension from the crankshaft to the pivot of the swing arm is required to be expanded. As a result, vehicle operability and the like are deteriorated.

Furthermore, in a power transmission device of a motorcycle including a conventional scooter-type motorcycle described in Patent Document 1, a part of the clutch mechanism is positioned below an oil level of lubricant in a crankcase of an engine and is soaked in the lubricant. In such arrangement, if a part of the clutch mechanism is soaked in the lubricant, a response ability of engagement and disengagement of the clutch mechanism is deteriorated, which may cause the vehicle operability to be deteriorated.

In order to prevent such defect, a lubricant discharge device (such as a scavenging pump) is provided to discharge the lubricant in a clutch mechanism so as not to easily soak the clutch mechanism in the lubricant. However, in such addition of the lubricant discharge device not only complicates the structure of the vehicle, but also causes power loss for driving the lubricant driving device, and hence, output performance of the vehicle is deteriorated.

SUMMARY OF THE INVENTION

The present invention is made in consideration of the circumstances encountered in the prior art mentioned above, and an object of the present invention is to provide a motorcycle capable of improving operability, comfort, and a driving performance by improving arrangement or layout of a continuously variable transmission in a driving force transmission device.

Another object of the present invention is to provide a motorcycle capable of improving output performance and vehicle operability while simplifying a structure of the vehicle by improving arrangement of a clutch in a driving force transmission device.

The above and other objects can be achieved according to the present invention by providing, in one aspect, a motorcycle including a crankcase that supports a crankshaft of an engine, a driving force transmission device that is provided at an intermediate position between the crankshaft and a driving wheel to transmit rotational force from the crankshaft to the driving wheel, and a swing arm that swingably supports the driving wheel, wherein the driving force transmission device includes a continuously variable transmission provided with an endless flexible member stretched between a drive pulley and a driven pulley, and a continuously variable transmission case covering the continuously variable transmission, in which a rotating center shaft of the driven pulley is arranged behind and above a rotating center shaft of the drive pulley in a side view of a vehicle as a motorcycle, and wherein the swing arm includes a pivot portion that is provided on one end side of the swing arm to be swingably attached to a vehicle body frame or the crankcase, and a driving wheel support portion provided on another end side of the swing arm to rotatably support the driving wheel, in which the pivot portion is positioned below a lower surface of the continuously variable transmission case in the side view of the vehicle so that at least a part of the swing arm overlaps vertically with a part of the continuously variable transmission case.

The present invention of this aspect includes the following preferred embodiment.

It may be desired that the continuously variable transmission is arranged on either one of right and left sides with respect to a center line of the motorcycle in a vehicle width direction, and the swing arm includes at least a part of the pivot portion on the one side arranged inside an outer end of the continuously variable transmission case in the vehicle width direction in a bottom view of the vehicle.

It may be further desired that the swing arm includes an outer end of the pivot portion on the one side arranged inside the outer end of the continuously variable transmission case in the vehicle width direction in the bottom view of the vehicle.

The present invention also provides, in another aspect, a motorcycle including a crankcase that supports a crankshaft of an engine, a driving force transmission device that is provided at an intermediate position between the crankshaft and a driving wheel to transmit rotational force from the crankshaft to the driving wheel, and a swing arm that swingably supports the driving wheel, wherein the driving force transmission device includes a clutch provided with a clutch body section that transmits or interrupts rotational force from the crankshaft or a transmission, and a clutch case covering the clutch, in which the clutch includes a lower end of the clutch body section positioned above an oil level of lubricant in the crankcase in a side view of a vehicle as a motorcycle.

The present invention of this aspect includes the following preferred embodiment.

It may be desired that the swing arm includes a pivot portion that is provided on one end side of the swing arm to be swingably attached to a vehicle body frame or the crankcase, and a driving wheel support portion provided on another end side of the swing arm to rotatably support the driving wheel, in which the pivot portion is positioned below a lower surface of the clutch case in the side view of the vehicle to vertically overlap at least a part of the swing arm with the clutch case.

It may be further desired that the clutch is arranged on either one of right and left sides with respect to a center line of the motorcycle in the vehicle width direction, and the swing arm includes at least a part of the pivot portion on the one side arranged inside an outer end of the clutch case in the vehicle width direction in a bottom view of the vehicle.

It may be further desired that the swing arm includes an outer end of the pivot portion on the one side arranged inside the outer end of the clutch case in the vehicle width direction in the bottom view of the vehicle.

According to the present invention, since the rotating center shaft of the driven pulley of the continuously variable transmission is arranged behind and above the rotating center shaft of a drive pulley in a side view of a vehicle, and the continuously variable transmission is configured to extend backward obliquely upward, it is possible to increase diameters of the drive pulley and the driven pulley while suppressing the expansion of length in a vehicle longitudinal direction. Therefore, since it is possible to expand a settable range of a reduction ratio of the continuously variable transmission, acceleration and maximum speed performance of a vehicle can be enhanced to thereby improve the driving performance of the vehicle, i.e., motorcycle.

In addition, as mentioned above, since the rotating center shaft of the driven pulley of the continuously variable transmission is arranged behind and above the rotating center shaft of the drive pulley in the side view of the vehicle, and the continuously variable transmission is configured to extend backward obliquely upward, it is possible to form a space below the driven pulley in the side view of the vehicle. As a result, by arranging the pivot portion of the swing arm in the space, the pivot portion can be positioned in a front of the vehicle, and hence, it becomes possible to reduce length in the vehicle longitudinal direction, thereby also improving the vehicle operability.

At the same time, according to such arrangement, since it is also possible to secure a sufficient length for the swing arm, a vertically movable range of a rear wheel of the vehicle, i.e., motorcycle, is expanded to improve riding comfort of the rider to thereby improve the vehicle riding comfort.

Further, according to the present invention, since the clutch of the driving force transmission device is positioned at an upper position in the crankcase, the clutch is not easily soaked in the lubricant in the crankcase. Accordingly, a response performance of engagement and disengagement of the clutch can be improved to thereby also improve vehicle operability.

Furthermore, since the clutch is not easily soaked in the lubricant in the crankcase, the response performance of the engagement and disengagement of the clutch can be further ensured without providing any lubricant discharge device in the crankcase. As a result, power loss during the operation of the lubricant discharge device is eliminated, so that the output performance of the vehicle is improved, and the structure of the vehicle can be also simplified, thus improving the vehicle maintainability.

The nature and further characteristic features of the present invention will be made clearer from the following descriptions made with reference to the accompanying drawings.

DESCRIPTION OF THE PREFERRED EMBODIMENT

Hereinafter, an embodiment of carrying out the present invention will be described with reference to the accompanying drawings.

Figure 1:
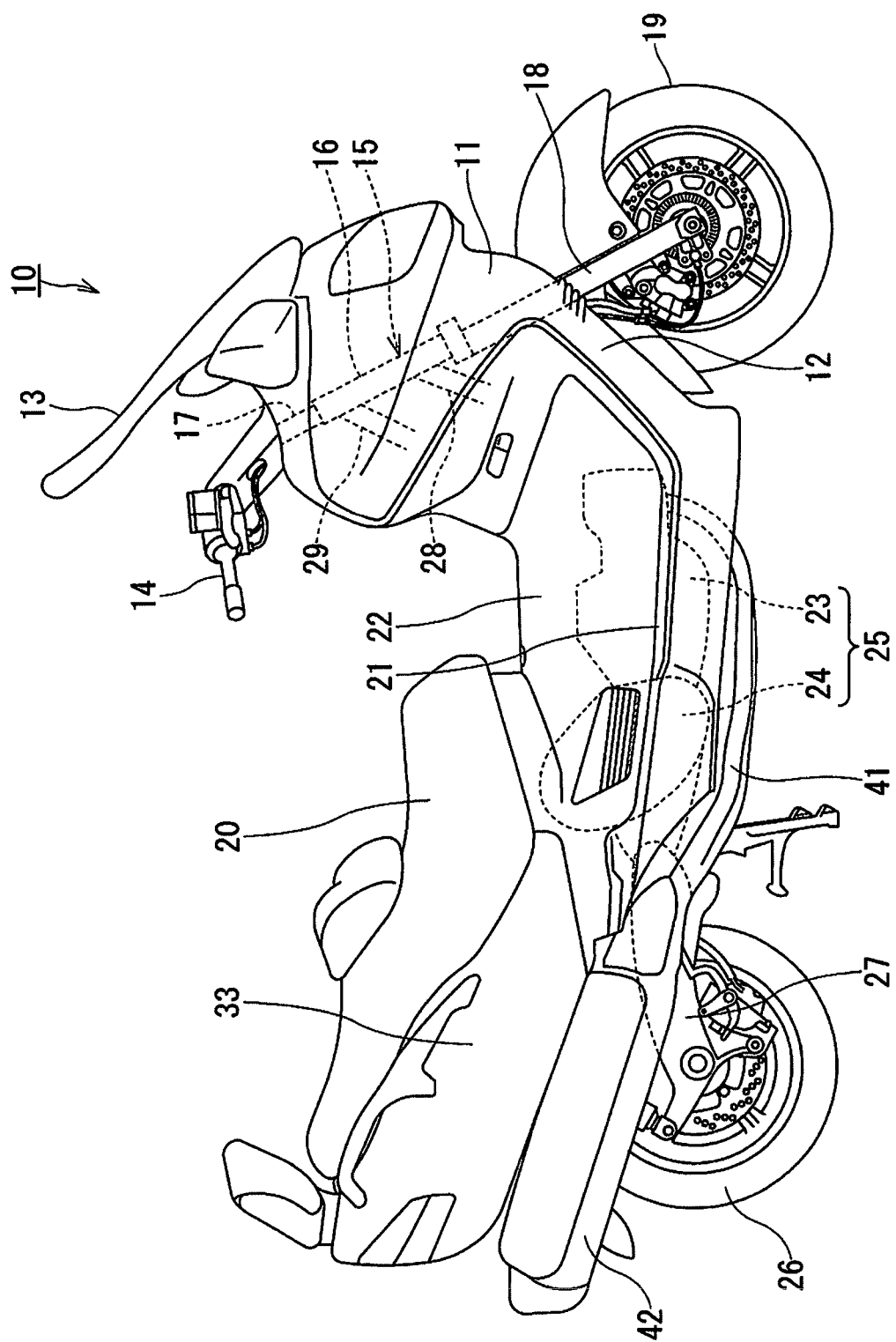
FIG. 1 is a right-side view showing one embodiment of a motorcycle as a vehicle in accordance with the present invention.
Figure 2:
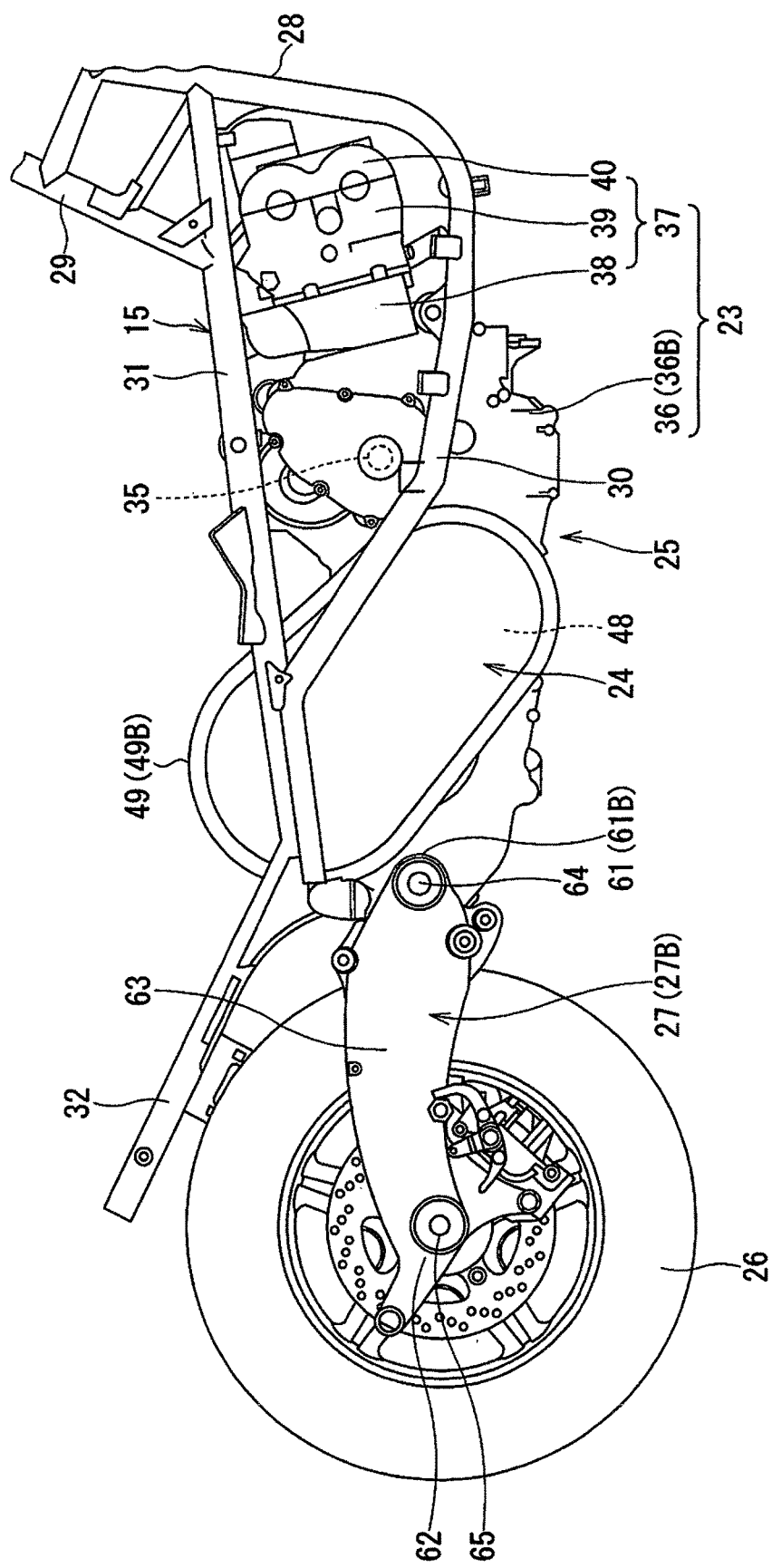
FIG. 2 is a right-side view showing an engine unit, a vehicle body frame and the like of the motorcycle of FIG. 1.
Figure 3:
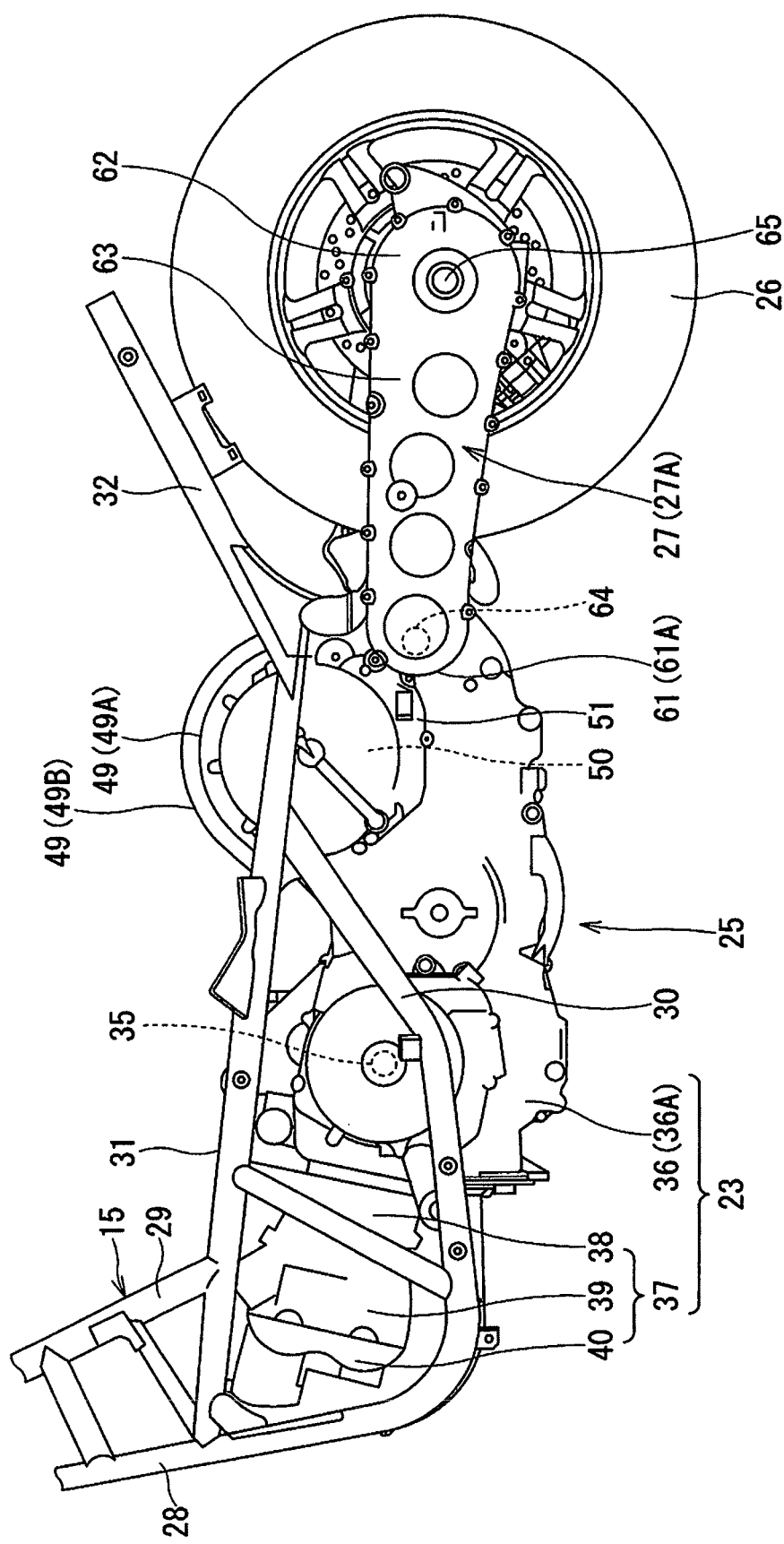
FIG. 3 is a left-side view showing the engine unit, the vehicle body frame and the like of the motorcycle of FIG. 1.

FIG. 1 is a right-side view showing one embodiment of a motorcycle in accordance with the present invention, FIG. 2 is a right-side view showing an engine unit, a vehicle body frame, and the like of the motorcycle of FIG. 1, and FIG. 3 is a left-side view showing the engine unit, the vehicle body frame, and the like of the motorcycle of FIG. 1.

It is further to be noted that terms of front and rear, right and left, and upper and lower (top and bottom) and the like terms indicating direction are used herein with reference to the accompanying drawings or with respect to a motorcycle on which a driver straddles.

With reference to FIGS. 1 to 3, a motorcycle 10 of the present embodiment is a large scooter-type vehicle with two seats. The motorcycle 10 has a vehicle front portion 11 provided with a leg shield 12 projecting in a vehicle lateral (right and left) side, a screen 13, and a handlebar 14.

The handlebar 14 is integrally rotatably coupled to a steering shaft 17 pivoted by a head pipe 16 of a vehicle body frame 15 shown in FIGS. 1 and 2. The steering shaft 17 suspends a front wheel 19 through a pair of left and right front forks 18. The steering shaft 17 is pivoted by the head pipe 16 to be pivotal in the right and left direction, and hence, the front wheel 19 is steered right and left by operating the handlebar 14.

As shown in FIG. 1, the motorcycle 10 is provided with a double seat 20 for two passengers on the rear side of the vehicle front portion 11. In an area from the vehicle front portion 11 to the double seat 20, there is provided a pair of left and right pair of plate-shaped foot boards 21, on which respective passengers seated on the double seat 20 (a driver and a fellow passenger) can put their feet thereon. The plate-shaped foot boards 21 extend in the vehicle longitudinal direction, and a center tunnel forming section 22 expanding upward is formed in a space between the foot boards 21.

In a lower center of the vehicle body frame 15 shown in FIG. 2, an engine unit 25 into which an engine 23 and a driving force transmission device 24 are integrated is mounted, and a swing arm 27 for holding a rear wheel 26 serving as a driving wheel is pivoted behind the engine unit 25. The swing arm 27 includes a gear train, not shown, for transmitting power from the engine unit 25 to the rear wheel 26 and swingably supports the rear wheel 26.

As shown in FIGS. 1 and 2, the vehicle body frame 15 is provided at its front end with the head pipe 16, and a pair of left and right pair down tubes 28 and a pair of left and right down tubes 29 extend from a lower portion and an upper portion of the head pipe 16, respectively. The down tubes 28 on a front side are formed by bending their lower portion downward and connected to a pair of left and right lower tubes 30.

Further, a pair of left and right pair of main tubes 31 extend backward from substantially central positions in a vertical direction of the down tubes 28 on the front side. Lower ends of the down tubes 29 on a rear side, as well as rear ends of the lower tubes 30, are connected to the respective main tubes 31.

Seat rails 32 extending rearward are connected to the respective rear portions of the main tubes 31.

As shown in FIG. 1, an article housing chamber, not shown, is arranged above the rear wheel 26, and the double seat 20 serving as a lid of the article housing chamber is provided above the article housing chamber to be opened.

The vehicle body frame 15, the engine unit 25, the article housing chamber and the like are covered with a vehicle body cover 33 made of synthetic resin.

As shown in FIGS. 2 to 5, the engine 23 in the engine unit 25 includes a crankcase 36 that accommodates and rotatably supports a crankshaft 35 and the like, and a cylinder assembly 37 that is provided in a front portion of the crankcase 36 substantially horizontally. The cylinder assembly 37 includes a cylinder 38, a cylinder head 39, and a head cover 40, which are sequentially stacked from the crankcase 36. In the cylinder head 39, an intake pipe, not shown, and an exhaust pipe 41 (refer to FIG. 1) are connected to upper and lower portions thereof, respectively. A leading end of the exhaust pipe 41 is connected to an exhaust muffler 42.

Figure 8:
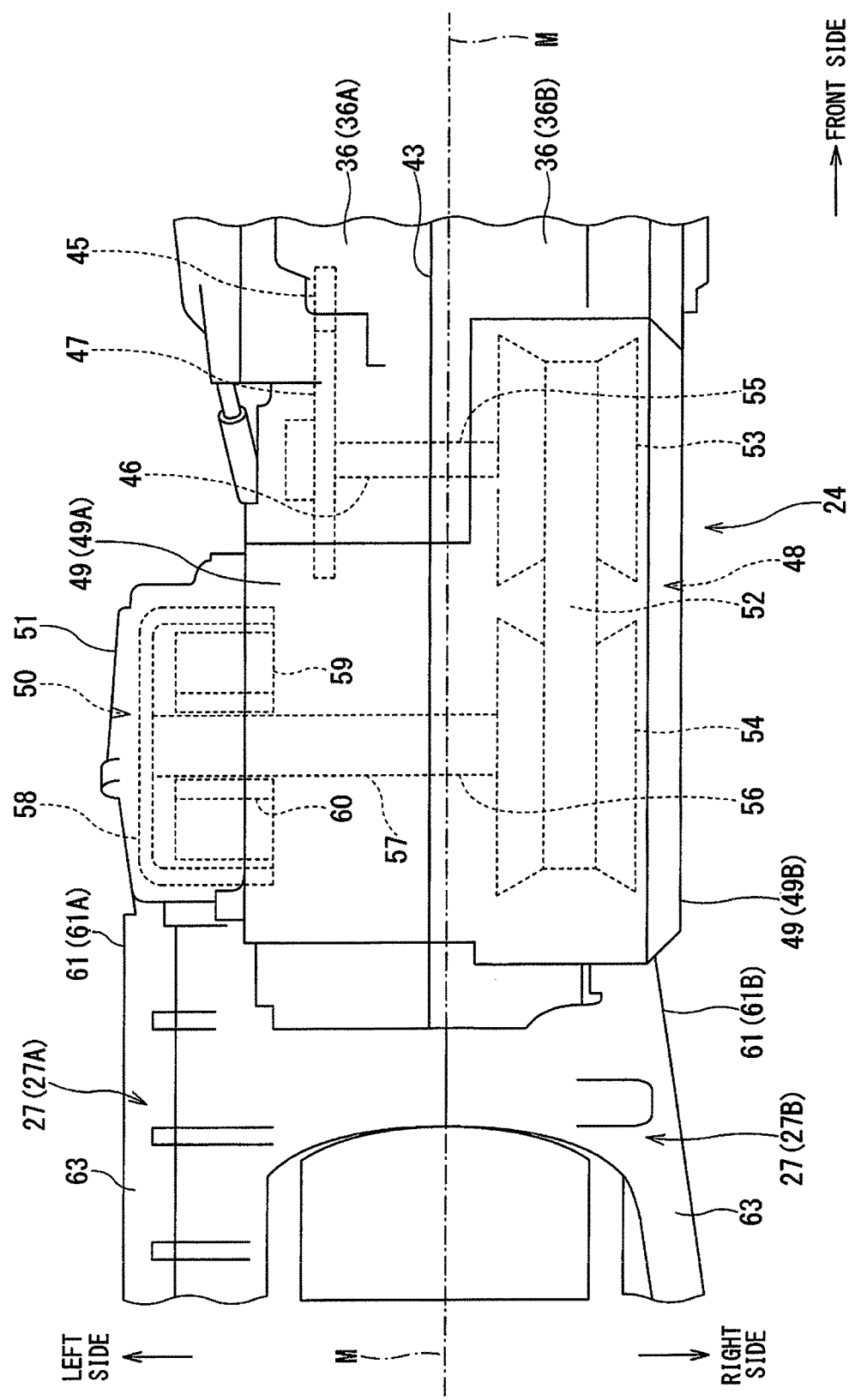
FIG. 8 is an enlarged plan view showing a part of FIG. 4.

The crankcase 36 has a mating face 43 (refer to FIGS. 4 and 5) in the vehicle longitudinal direction, and is composed of a left-side crankcase 36A and a right-side crankcase 36B to be separable in a vehicle width direction. The crankcase 36 accommodates the crankshaft 35 that is provided on its one side (a right side in the present embodiment) with a primary drive gear 45 as shown in FIG. 8, and the crankcase 36 also accommodates a counter shaft 46 that is rotatably supported behind the crankshaft 35 in parallel thereto.

The counter shaft 46 is provided with a primary driven gear 47 that engages with the primary drive gear 45, so that rotational force from the crankshaft 35 is transmitted to the counter shaft 46.

As shown in FIGS. 2 and 3, the driving force transmission device 24 in the engine unit 25 is provided at an intermediate position between the crankshaft 35 and the rear wheel 26 so that the rotational force transmitted from the crankshaft 35 to the counter shaft 46 through the primary drive gear 45 and the primary driven gear 47 is transmitted to the rear wheel 26.

Figure 6:
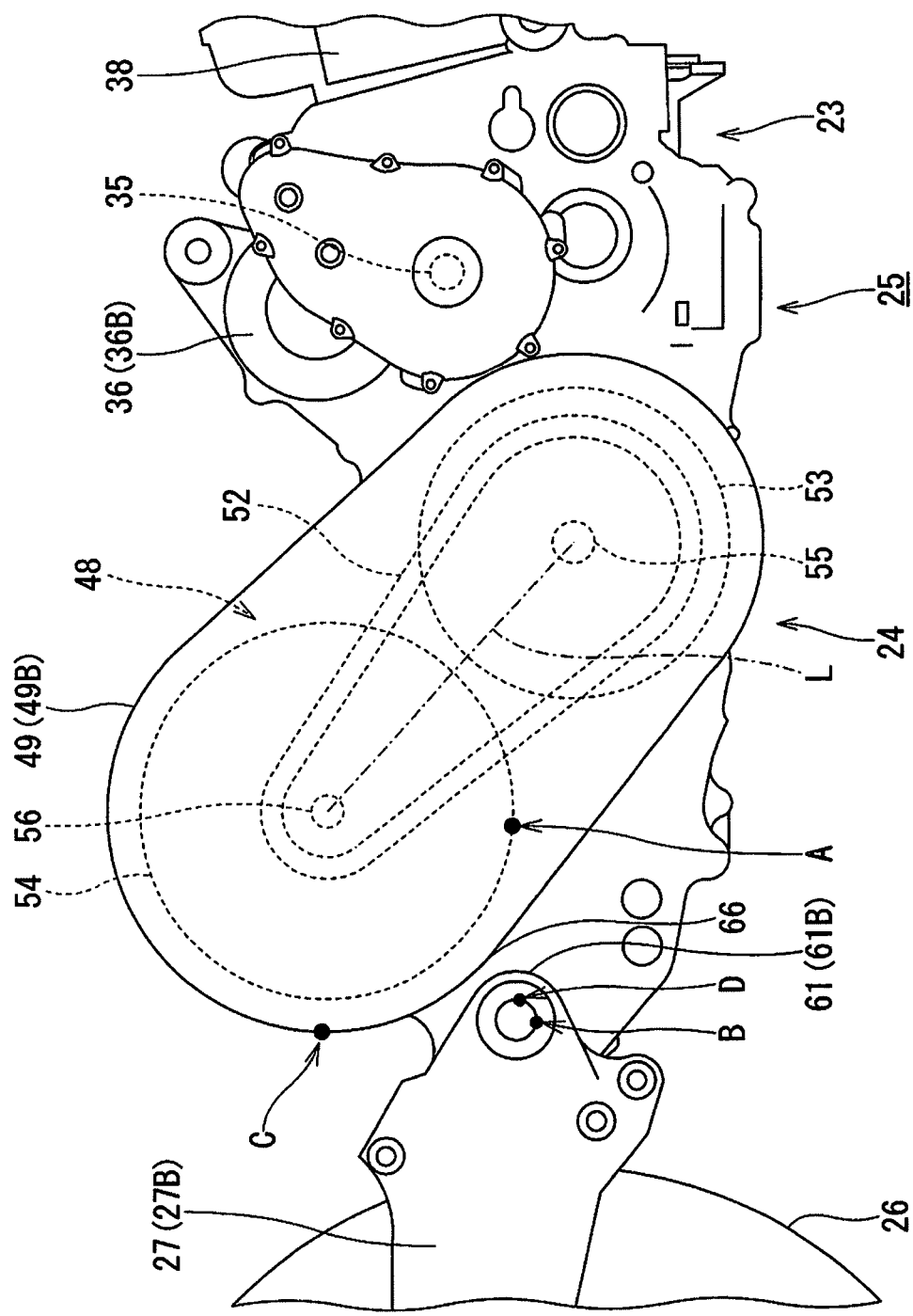
FIG. 6 is a side view showing a periphery of a continuously variable transmission in a driving force transmission device of FIG. 2.
Figure 7:
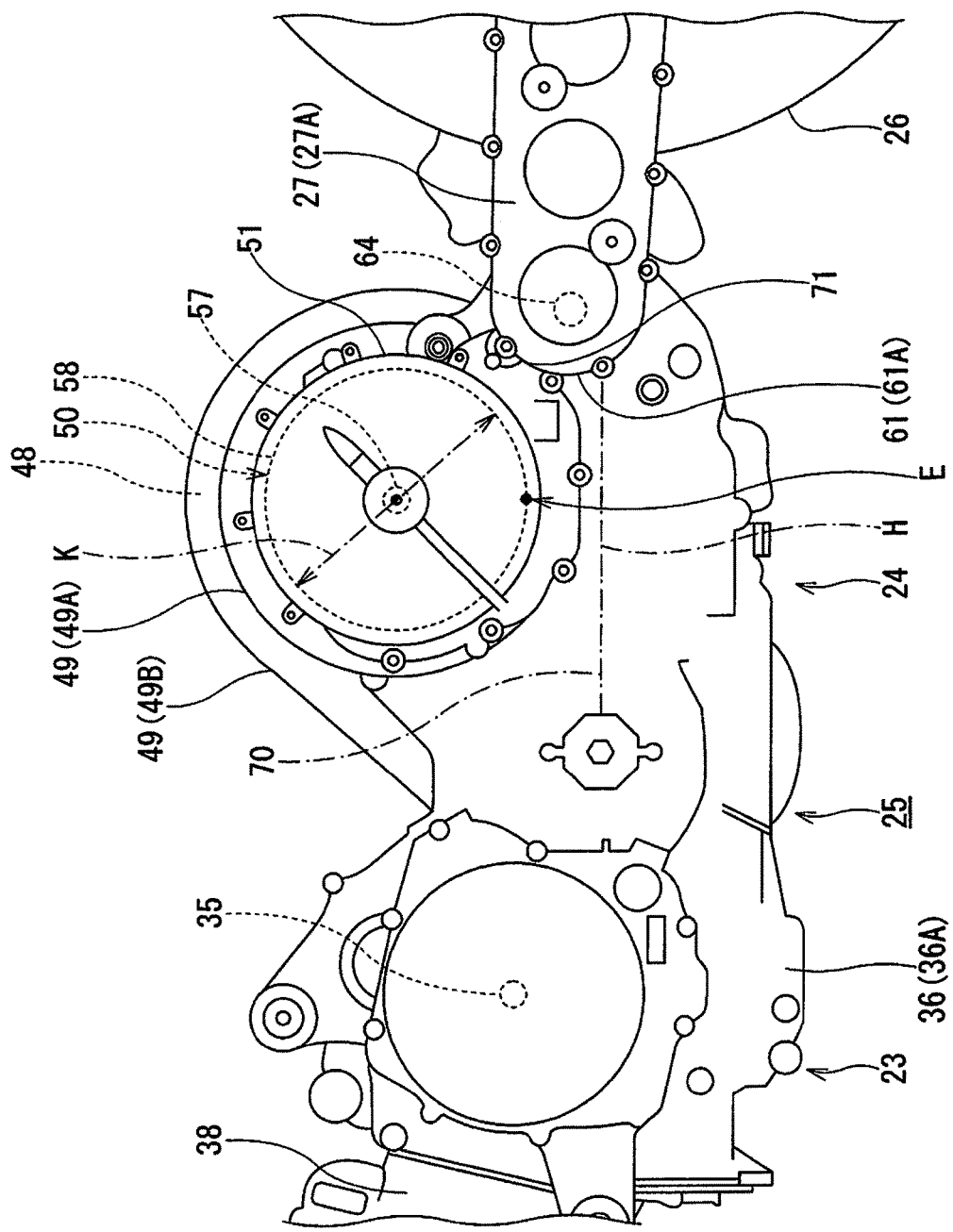
FIG. 7 is a side view showing a periphery of a clutch in a driving force transmission device of FIG. 3.

The driving force transmission device 24, as shown in FIGS. 6 and 7, includes a continuously variable transmission 48, a continuously variable transmission case 49, a clutch 50, and a clutch case 51.

In the plan view of the vehicle shown in FIG. 8, the continuously variable transmission 48 and the clutch 50 are arranged on one side (such as a right side) and another side (such as a left side), respectively, with respect to a center line M in the vehicle width direction. The continuously variable transmission 48 and the clutch 50 may be arranged on the left side and the right side, respectively.

As shown in FIGS. 6 and 8, the continuously variable transmission 48 is a belt-drive-type continuously variable transmission in which a V-belt 52 that is an endless flexible member is stretched between the drive pulley 53 and the driven pulley 54. The drive pulley 53 and the driven pulley 54 are provided on a drive shaft 55 and a driven shaft 56, respectively. The drive shaft 55 is splined to the counter shaft 46 (i.e., spline-coupling), for example, to be rotatable integrally with the counter shaft 46.

Thus, the rotational force transmitted to the counter shaft 46 from the crankshaft 35 through the drive shaft 55, the drive pulley 53, the V-belt 52, and the driven pulley 54, is transmitted to the driven shaft 56. At this time, an effective diameter of a belt around the drive pulley 53 in the continuously variable transmission 48 is changed, thereby being capable of changing the rotation speed of the driven pulley 54 with respect to the drive pulley 53, that is, a change gear ratio is continuously changed with non-step. Herein, the effective diameter of a belt around the drive pulley 53 is changed by centrifugal force, motor driving force, or the like.

As shown in FIG. 8, the continuously variable transmission case 49 is a case which covers the V-belt 52 of the continuously variable transmission 48, the drive pulley 53, the driven pulley 54, the drive shaft 55, the driven shaft 56, and the like. The continuously variable transmission case 49 is formed by joining a left-side continuously variable transmission case 49A that is integrally molded with the left-side crankcase 36A and a right-side continuously variable transmission case 49B that is integrally molded with the right-side crankcase 36B, to each other.

The clutch 50 of the driving force transmission device 24 is a wet-type centrifugal clutch, and as shown in FIGS. 7 and 8, includes a clutch body section that transmits or interrupts the rotational force transmitted to the continuously variable transmission 48 from the crankshaft 35 through the primary drive gear 45 and the primary driven gear 47.

The clutch body section is composed of a clutch housing 58 that is provided integrally with a clutch shaft 57 in a rotatable manner, and a clutch plate 59 that is provided in the clutch housing 58 so as to be brought into sliding contact with the clutch housing 58. The clutch shaft 57 is provided coaxially and integrally with the driven shaft 56 in a rotatable manner. Furthermore, the clutch plate 59 is coupled to a gear train in the swing arm 27 through a clutch hub 60 and a reduction gear mechanism, not shown.

Thus, when the clutch plate 59 is brought into sliding contact with the clutch housing 58 and engaged therewith, the rotational force transmitted to the continuously variable transmission 48 from the crankshaft 35 through the primary drive gear 45 and the primary driven gear 47 is transmitted to the reduction gear mechanism and the gear train in the swing arm 27 from the driven shaft 56 of the continuously variable transmission 48 through the clutch shaft 57, the clutch housing 58, the clutch plate 59, and the clutch hub 60, of the clutch 50. Accordingly, the rotational force is transmitted to an axle shaft 65, described hereinafter, to drive the rear wheel 26. The clutch shaft 57, the clutch housing 58, the clutch plate 59, and the clutch hub 60, of the clutch 50, are covered with the clutch case 51 joined to the left-side continuously variable transmission case 49A from the outside of the vehicle.

Figure 4:
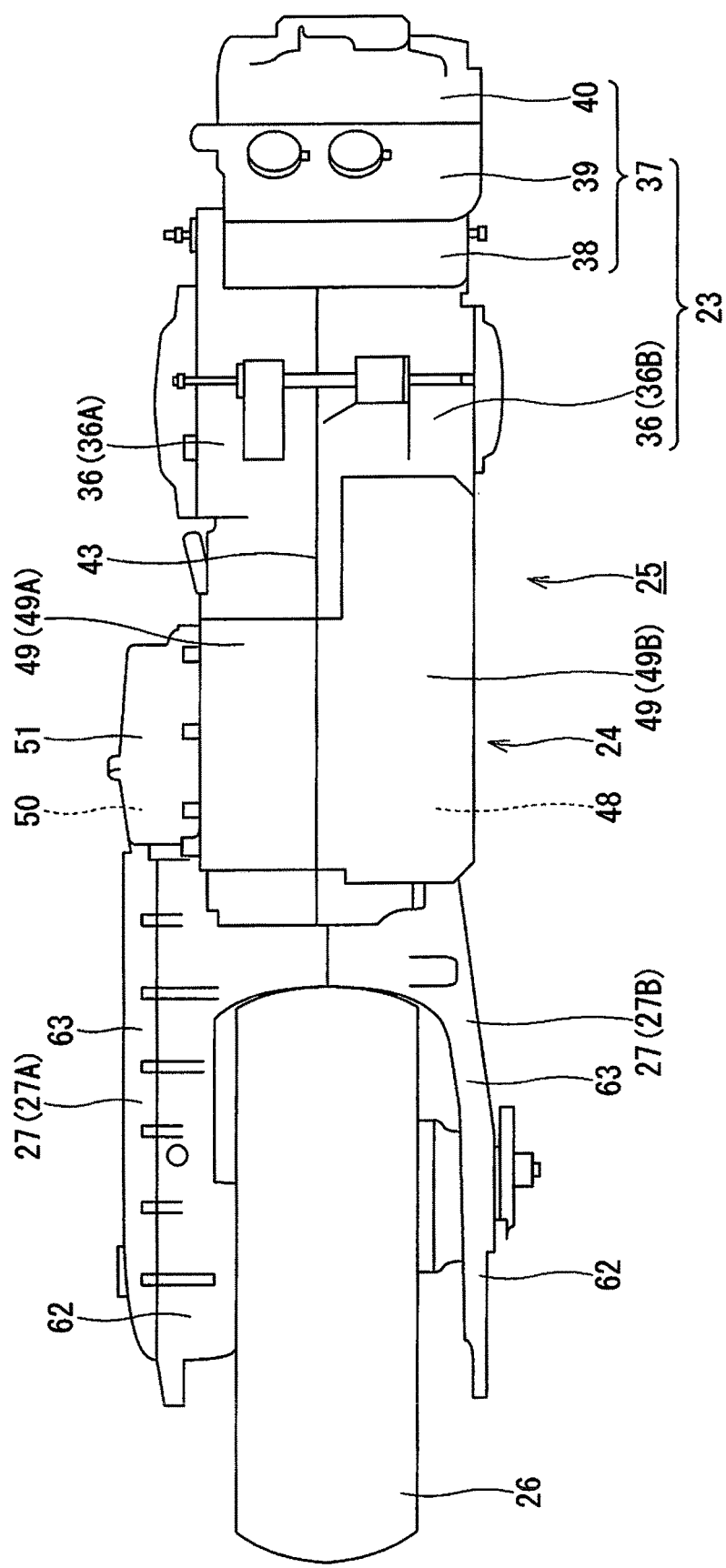
FIG. 4 is a plan view showing the engine unit of FIG. 2.
Figure 5:
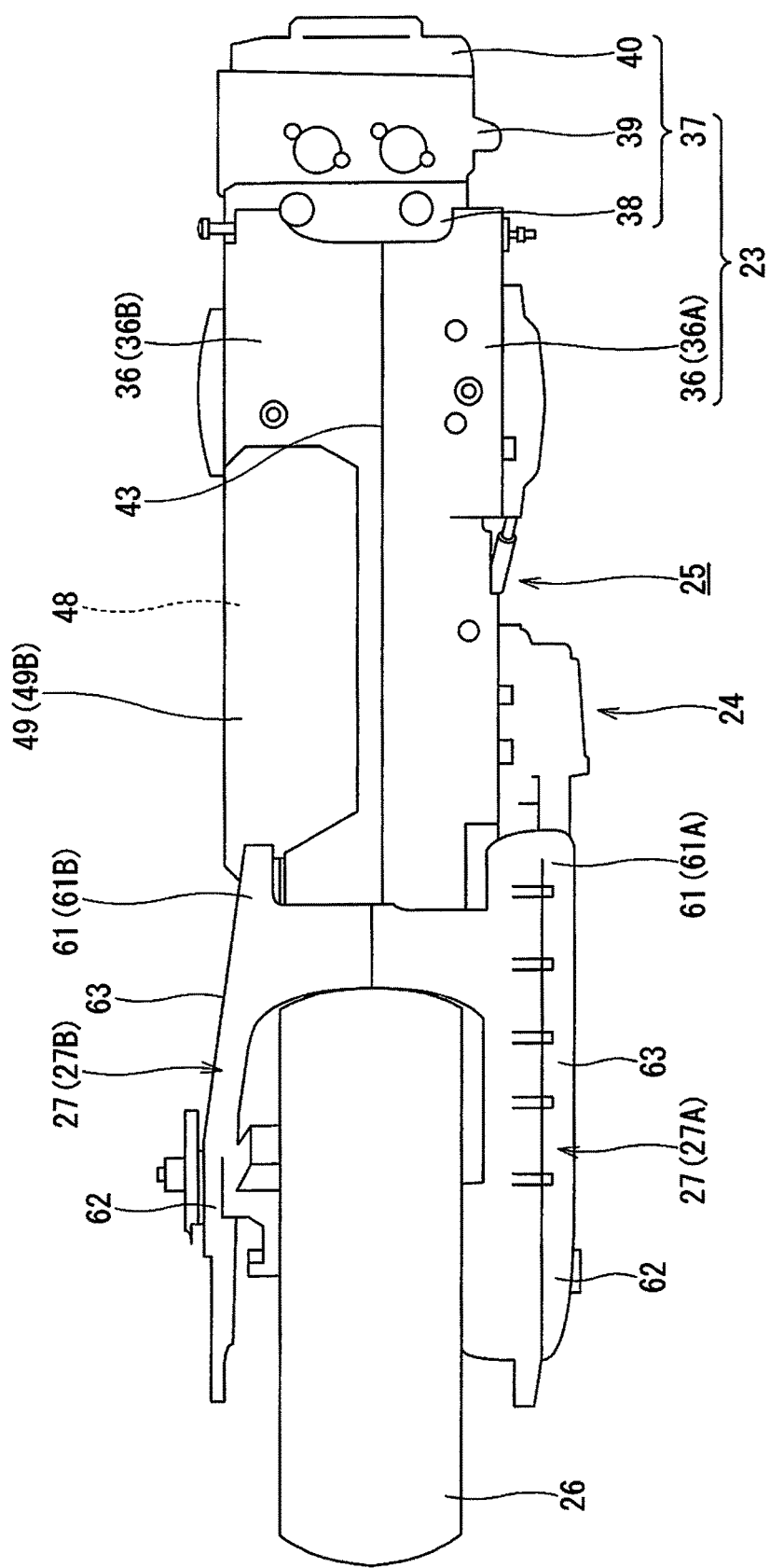
FIG. 5 is a bottom view showing the engine unit of FIG. 2.

As shown in FIGS. 4 and 5, the swing arm 27 is formed by joining a left-side swing arm 27A and a right-side swing arm 27B to each other in the vehicle width direction. Moreover, the swing arm 27, as shown in FIGS. 2 and 3, includes: a pivot portion 61 provided on a front end side of the swing arm 27, into which a pivot 64 is inserted to swingably attach the pivot portion 61 to the crankcase 36; a rear wheel support portion 62 serving as a driving wheel support portion provided on a rear end side of the swing arm 27, in which the axle shaft 65 is provided to rotatably support the rear wheel 26; and an arm portion 63 that couples the pivot portion 61 and the rear wheel support portion 62 to each other. The arm portion 63 in the left-side swing arm 27A includes the gear train for drive transmission.

In the continuously variable transmission 48 in the present embodiment, as shown in FIG. 6, the driven shaft 56, which is a rotating center shaft of the driven pulley 54, is arranged behind and above the drive shaft 55 as a rotating center shaft of the drive pulley 53. Accordingly, a straight line L connecting the drive shaft 55 and the driven shaft 56 to each other extends backward obliquely upward so that the continuously variable transmission 46 extends backward obliquely upward.

The driven pulley 54 is also arranged so that a lower end point A thereof is positioned above a lower end point B of the pivot 64 supporting the swing arm 27 in the side view of a vehicle shown in FIG. 6.

In the side view of a vehicle shown in FIG. 6, the continuously variable transmission case 49 is configured so that a rear end point C thereof is positioned behind a front end point D of the pivot 64 supporting the swing arm 27. In addition, in the side view of the vehicle shown in FIG. 6, the continuously variable transmission case 49 is configured so that the pivot portion 61 on the right side of the swing arm 27 (a right-side pivot portion 61B) is positioned below a lower surface 66 of the continuously variable transmission case 49 (the right-side continuously variable transmission case 49B), that is, at least a part of the swing arm 27, or a front portion including the right-side pivot portion 61B, overlaps vertically with a rear portion of the continuously variable transmission case 49 (the right-side continuously variable transmission case 49B).

Figure 9:
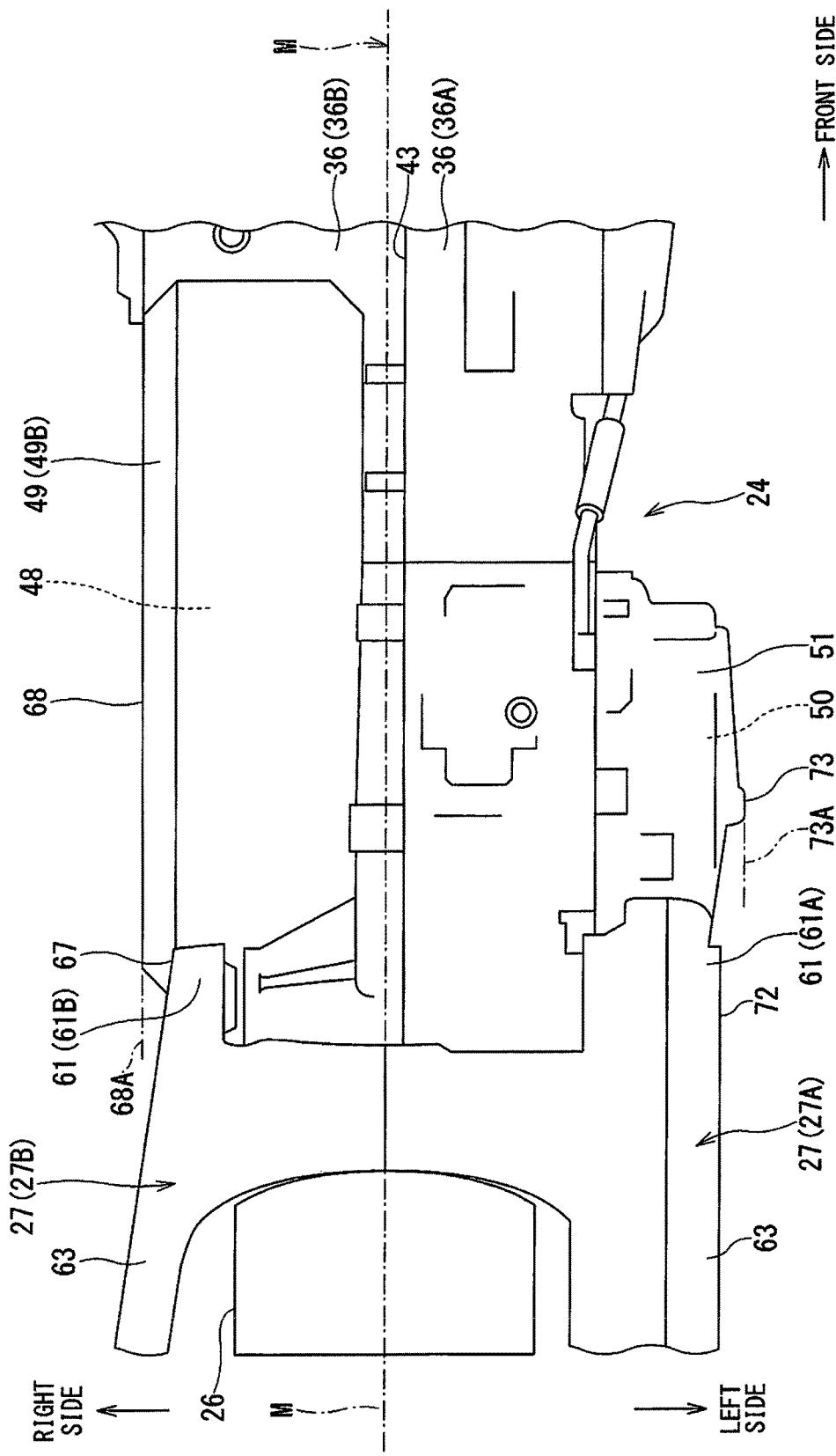
FIG. 9 is an enlarged bottom view showing a part of FIG. 5.

In the present embodiment, the continuously variable transmission 48 is arranged on the right side with respect to the center line M in the vehicle width direction as shown in FIGS. 8 and 9.

In the bottom view of the vehicle shown in FIG. 9, the swing arm 27 is configured so that at least a part of the right-side pivot portion 61B, or an outer end 67 of the right-side pivot portion 61B is arranged inside an extension line 68A including an outer end 68 of the continuously variable transmission case 49 (right-side continuously variable transmission case 49B) in the vehicle width direction.

In the clutch 50 in the present embodiment, the clutch shaft 57, which is a rotating center shaft, is arranged behind and above the crankshaft 35 in the vehicle side view shown in FIG. 7. The clutch 50 is also configured so that an lower end point E of the clutch housing 58 with a large diameter in the clutch body section is positioned above an oil level H of lubricant 70 stored in the crankcase 36. Specifically, if the diameter of the clutch housing 58 is indicated as K, the lower end point E of the clutch housing 58 and the oil level H of the lubricant 70 are set so as to separate from each other by K/3 or more.

In the vehicle side view shown in FIG. 7, the clutch 50 is also configured so that the pivot portion 61 on the left side of the swing arm 27 (a left-side pivot portion 61A) is positioned below a lower surface 71 of the clutch case 51 accommodating the clutch 50 and at least a part of the swing arm 27, or a front portion thereof including the left-side pivot portion 61 in the swing arm 27, overlaps vertically with the clutch case 51.

As shown in FIGS. 8 and 9, the clutch 50 is arranged in a left side with respect to the center line M in the vehicle width direction in the present embodiment. In the bottom view of the vehicle of FIG. 9, the swing arm 27 is configured so that at least a part of the left-side pivot portion 61A or an outer end 72 of the left-side pivot portion 61A in the present embodiment is arranged inside the extension line 73A including the outer end 73 of the clutch case 51 in the vehicle width direction.

According to the structure or configuration of the present embodiment described hereinabove, the following advantageous effects and functions (1) to (8) can be achieved.

(1) With reference to the vehicle side view of FIG. 6, since the driven shaft 56 of the driven pulley 54 of the continuously variable transmission 48 is arranged behind and above the drive shaft 55 of the drive pulley 53, the continuously variable transmission 48 is located to extend backward obliquely upward. Accordingly, it becomes possible to increase the diameters of the drive pulley 53 and the driven pulley 54 while suppressing the expansion of length of the continuously variable transmission 48 in the vehicle longitudinal direction, and therefore, the range capable of setting a reduction ratio of the continuously variable transmission 48 can be expanded, and hence, the acceleration and maximum speed performance are enhanced to thereby improve the driving performance of the vehicle.

(2) In the side view of a vehicle shown in FIG. 6, according to the arrangement of the driven shaft 56 of the driven pulley 54 of the continuously variable transmission 46 so as to be behind and above the drive shaft 55 of the drive pulley 53, as also mentioned above (1), the continuously variable transmission 48 extends backward obliquely upward. Thus, it is possible to form a space below the driven pulley 54 in the side view of a vehicle. As a result, by arranging the pivot portion 61 (right-side pivot portion 61B) of the swing arm 27 in the space, the pivot portion 61 (right-side pivot portion 61B) can be positioned in the front portion of the vehicle.

In addition, as described herein later, since it is possible to position the pivot portion 61 (left-side pivot portion 61A) in the front of the vehicle and to reduce the length of the motorcycle 10 in the vehicle longitudinal direction, the vehicle operability can be improved. At the same time, since it is also possible to secure the sufficient length for the swing arm, the vertically movable range of the rear wheel 26 can be expanded to thereby improve the riding comfort of the vehicle and to improve the vehicle comfort.

(3) As shown in FIGS. 6 and 9, at least a part of the right-side pivot portion 61B of the swing arm 27 is positioned inside the extension line 68A including the outer end 68 of the continuously variable transmission case 49 (right-side continuously variable transmission case 49B) accommodating the continuously variable transmission 48 so as to be fitted in a space below the continuously variable transmission case 49. Accordingly, the peripheral space around the continuously variable transmission case 49 is effectively usable for making easy and compact the layout of parts or components.

(4) As shown in FIGS. 6 and 9, the outer end 67 of the right-side pivot portion 61B of the swing arm 27 is positioned inside the extension line 68A including the outer end 68 of the continuously variable transmission case 49 in the vehicle width direction. Accordingly, there exists no projection of the outer end 67 projecting outward from the continuously variable transmission case 49 in the vehicle width direction. As a result, it is possible to suppress the expansion of the width of the lower portion of the motorcycle 10, thus enabling the inclination angle (bank angle) of the vehicle to be secured, and improving the vehicle operability.

(5) As shown in FIGS. 7 and 8, since the clutch 50 of the driving force transmission device 24 is positioned in the crankcase 36 above the oil level H of the lubricant 70 in the crankcase 36, the clutch 50 is not easily soaked in the lubricant 70 in the crankcase 36. As a result, the response performance to the engagement and/or disengagement of the clutch 50 between the clutch housing 58 and the clutch plate 59 can be enhanced, thereby further improving the vehicle operability.

Moreover, since the clutch 50 is not easily soaked in the lubricant 70 in the crankcase 36, it is possible to secure the response ability to the engagement and/or disengagement of the clutch without providing any lubricant discharge device in the crankcase 36. Accordingly the power loss during the operation of the lubricant discharge device is eliminated, and the output performance of the motorcycle 10 can be hence improved. In addition the structure of the motorcycle 10 is simplified and the vehicle maintainability can be improved.

(6) As shown in FIG. 7, since the clutch shaft 57 of the clutch 50 is arranged above the crankshaft 35, and the left-side pivot portion 61A of the swing arm 27 is positioned below the lower surface 71 of the clutch case 51, the front portion of the swing arm 27 including the left-side pivot portion 61A, and the clutch case 51 are disposed in the vertically overlapped with each other. Accordingly, by arranging the pivot portion 61 (left-side pivot portion 61A) of the swing arm 27 in a space below the clutch case 51, the pivot portion 61 (left-side pivot portion 61A) can be positioned in the front of the vehicle.

Thus, as described hereinbefore, it is possible to position the pivot portion 61 (right-side pivot portion 61B) in the front of the vehicle and to reduce length of the motorcycle 10 in the vehicle longitudinal direction, so that the vehicle operability can be improved. Moreover, since it becomes also possible to secure the sufficient length for the swing arm 27, the vertically movable range of the rear wheel 26 is expanded to thereby improve the riding comfort of the motorcycle 10 and also improve the vehicle comfort.

(7) As shown in FIGS. 7 and 9, at least a part of the left-side pivot portion 61A of the swing arm 27 is positioned inside the outer end 73 of the clutch case 51 accommodating the clutch 50 so as to be fitted in a space below the clutch case 51. Accordingly, the peripheral space around the clutch case 51 is effectively usable for making a component layout to be facilitated.

(8) As shown in FIGS. 7 and 9, since the outer end 72 of the left-side pivot portion 61A of the swing arm 27 is positioned inside the extension line 73A including the outer end 73 of the clutch case 51 in the vehicle width direction, there exists no projection of the outer end 72 projecting outward from the continuously variable transmission case 49 in the vehicle width direction. As a result, it becomes possible to suppress the expansion of the width of the lower portion of the motorcycle 10 to thereby secure the inclination angle (bank angle) of the vehicle, and it becomes also possible to improve the vehicle operability.

It is to be noted that the present invention is not limited to the embodiment described above, and many other changes and modifications or alternations may be made within the sprits of the present invention and without departing from the scope of the appended claims.

For example, the clutch 50 may be a wet multi-plate clutch or a wet single plate clutch.

Further, although the described embodiment provides the clutch 50 that transmits or interrupts rotational force transmitted to the continuously variable transmission 48 from the crankshaft 35, the clutch 50 may be configured to transmit the rotational force from the crankshaft 35 to the continuously variable transmission 48 or interrupt the rotational force.

Furthermore, although there is described the swing arm 27 that is swingably attached to the crankcase 36 through the pivot 64, the swing arm 27 may be swingably attached to the vehicle body frame 15 through the pivot 64.

What is claimed is:

1. A motorcycle including:
a crankcase that supports a crankshaft of an engine,
a driving force transmission device that is provided at an intermediate position between the crankshaft and a driving wheel to transmit rotational force from the crankshaft to the driving wheel, and
a swing arm that swingably supports the driving wheel,
wherein the driving force transmission device comprises a continuously variable transmission provided with an endless flexible member stretched between a drive pulley and a driven pulley, and a continuously variable transmission case covering the continuously variable transmission, in which a rotating center shaft of the driven pulley is arranged behind and above a rotating center shaft of the drive pulley in a side view of a motorcycle,
wherein the swing arm includes a pivot portion that is provided on one end side of the swing arm to be swingably attached to a motorcycle body frame or the crankcase, and a driving wheel support portion provided on another end side of the swing arm to rotatably support the driving wheel, in which the pivot portion is positioned below a lower surface of the continuously variable transmission case in the side view of the motorcycle so that at least one part of the swing arm overlaps vertically with a part of the continuously variable transmission case,
wherein the driving force transmission device further comprises a clutch provided with a clutch body section that transmits or interrupts rotational force from the crankshaft or a transmission, and a clutch case covering the clutch, in which the clutch includes a lower end of the clutch body section positioned above an oil level of lubricant in the crankcase in the side view of the motorcycle,
wherein the swing arm includes a pivot portion that is provided on one end side of the swing arm to be swingably attached to a motorcycle body frame or the crankcase, and a driving wheel support portion provided on another end side of the swing arm to rotatably support the driving wheel, in which the pivot portion is positioned below a lower surface of the clutch case in the side view of the motorcycle to vertically overlap at least a part of the swing arm with the clutch case, and
wherein the clutch is arranged on either one of right and left sides with respect to a center line of the motorcycle in a motorcycle width direction, and the swing arm includes at least one part of the pivot portion on the one side arranged inside an outer end of the clutch case in the motorcycle width direction in a bottom view of the motorcycle.

2. The motorcycle according to claim 1, wherein the continuously variable transmission is arranged on either one of right and left sides with respect to a center line of the motorcycle in the motorcycle width direction, and the swing arm includes at least one part of the pivot portion on the one side arranged inside an outer end of the continuously variable transmission case in the motorcycle width direction in a bottom view of the motorcycle.

3. The motorcycle according to claim 2, wherein the swing arm includes an outer end of the pivot portion on the one side arranged inside the outer end of the continuously variable transmission case in the motorcycle width direction in the bottom view of the motorcycle.

4. The motorcycle according to claim 1, wherein the swing arm includes an outer end of the pivot portion on the one side arranged inside the outer end of the clutch case in the motorcycle width direction in the bottom view of the motorcycle.

* * * * *